United States Patent [19]

Linde et al.

[11] Patent Number: 4,669,670
[45] Date of Patent: Jun. 2, 1987

[54] EXPELLER FOR MANURE SPREADERS

[75] Inventors: Gilbert W. Linde, Oxford; James T. Clevenger, Jr., Lancaster, both of Pa.

[73] Assignee: New Holland Inc., New Holland, Pa.

[21] Appl. No.: 763,168

[22] Filed: Aug. 7, 1985

[51] Int. Cl.⁴ .......................... A01C 3/06; A01C 15/16
[52] U.S. Cl. ..................................... 239/660; 239/675
[58] Field of Search ............... 239/660, 672, 675, 679; 172/121, 271, 552, 553; 56/17.5, 295

[56]  References Cited

U.S. PATENT DOCUMENTS

| | | | |
|---|---|---|---|
| 358,209 | 2/1887 | Lindgren | 172/271 |
| 927,141 | 7/1909 | Hackney | 239/679 |
| 2,714,772 | 8/1955 | Erickson | 172/121 X |
| 4,069,982 | 1/1978 | Brackbill | 239/679 X |

Primary Examiner—Andres Kashnikow
Assistant Examiner—Patrick N. Burkhart
Attorney, Agent, or Firm—Darrell F. Marquette; Frank A. Seemar; Larry W. Miller

[57]  ABSTRACT

An expeller for discharging manure from the tank of a manure spreader avoids severe deformation when contacting rocks in the manure by having paddles fastened with shear bolts which are designed to fail whenever a predetermined load is exerted on the outer ends of the paddles. If the shear bolts fastening any one of the paddles should fail while the expeller is operating to discharge manure from the tank of a manure spreader, that paddle will be moved to a retracted position and will be held there until new shear bolts can be installed.

7 Claims, 4 Drawing Figures

EXPELLER FOR MANURE SPREADERS

BACKGROUND AND SUMMARY OF THE INVENTION

U.S. Pat. Nos. 4,362,272 and 4,467,967 generally disclose a type of manure spreader that includes a V-shaped tank for containing manure, an auger conveyor in the bottom of the tank for moving manure toward an opening in one of the sidewalls of the tank, and an expeller mounted adjacent the opening in the one tank sidewall to discharge manure in a lateral spread pattern away from the tank.

The expeller of U.S. Pat. No. 4,362,272 consists of a plurality of scoop sections welded to a rotatable shaft to form a rigid assembly which is quiet during operation and generally durable. A problem exists with this type of expeller, however, if rocks are inadvertently loaded into the tank with manure and then subsequently discharged with the manure by the expeller. The problem is that these rocks often contact the expeller scoop sections in a manner that causes permanent deformation of the expeller. Should the expeller become severely deformed it will have to be replaced with a new expeller. Such replacement of a deformed expeller is very expensive and time consuming.

The expeller of U.S. Pat. No. 4,467,967 is comprised of a set of blades with each blade pivotally connected to a rotatable shaft. While this type of expeller virtually eliminates the above mentioned problem of deformation of the expeller due to rocks, the pivotal blades are noisy during operation and the pivot connections for the blades are expensive and have limited durability.

Therefore, it is an object of the present invention to provide an improved expeller for the type of manure spreader generally disclosed in U.S. Pat. Nos. 4,362,272 and 4,467,967 which will not be severely deformed by contacting foreign objects such as rocks in the manure but will be quiet in operation and durable.

The improved expeller of the present invention comprises paddles fastened to support members that are fixed to a rotatable shaft by first and second fastener means. In the preferred embodiment of the improved expeller, the first fastener means constitutes shear bolts which are designed to fail when a predetermined load is exerted on the paddle. If these shear bolts fail under the predetermined load, the paddle may be pivoted about the second fastener means from an extended position to a retracted position. The second fastener means will hold the paddle in the retracted position until it is manually returned to the extended position for installation of new shear bolts.

DESCRIPTION OF THE PREFERRED EMBODIMENT

Figure 1:
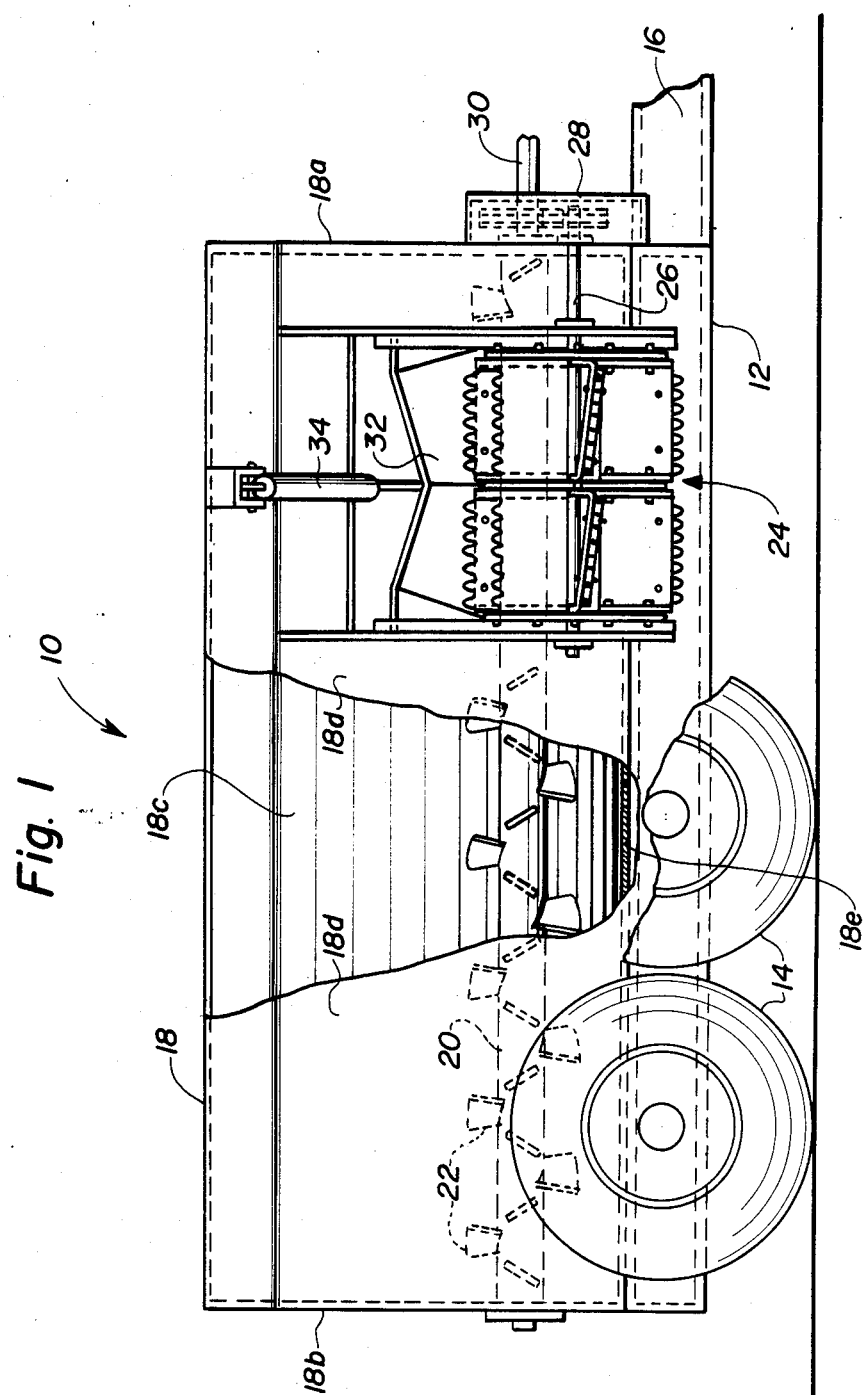
FIG. 1 is a side elevation view, with portions broken away, of a manure spreader incorporating the expeller of the present invention.

A manure spreader 10 shown in FIG. 1 includes a base frame 12 supported by wheels 14. A tongue 16 is fixed to the base frame 12 at the forward end thereof and is adapted for connection to a towing vehicle such as a tractor (not shown). A tank 18 for containing manure is mounted on the base frame 12, and an auger 20 is rotatably mounted in the tank 18 near the bottom thereof. The tank 18 is comprised of endwalls 18a and 18b arranged parallel to each other, and sidewalls 18c and 18d arranged to slope toward each other to form a bottom wall 18e. The auger 20 has flights 22 to move manure toward an opening formed in the tank sidewall 18d.

An expeller 24 according to the present invention is disposed adjacent the opening in the tank sidewall 18d to discharge manure generally in a lateral direction away from the tank 18. The expeller 24 includes a central shaft 26 which is rotated via a chain and sprocket drive 28 from the axial shaft 30 of the auger 20. A deflector 32 is mounted above the expeller 24, and a hydraulic cylinder 34 is connected between the deflector 32 and the tank 18 to adjust the position of the deflector 32.

Figure 2:
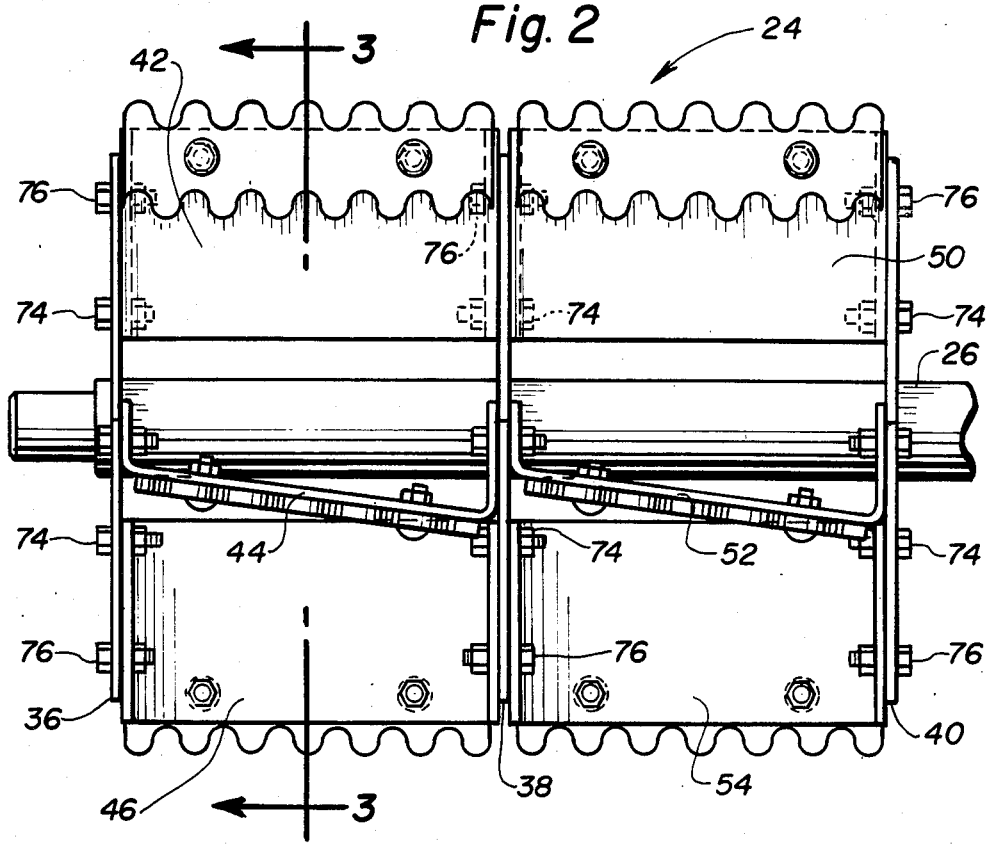
FIG. 2 is an enlarged side view of the expeller shown in FIG. 1.
Figure 3:
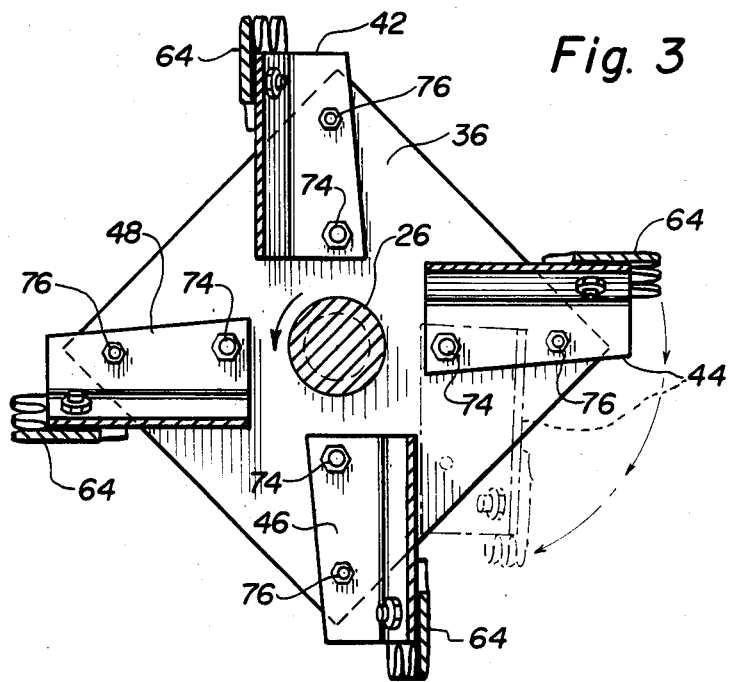
FIG. 3 is a sectional view taken along lines 3—3 in FIG. 2.
Figure 4:
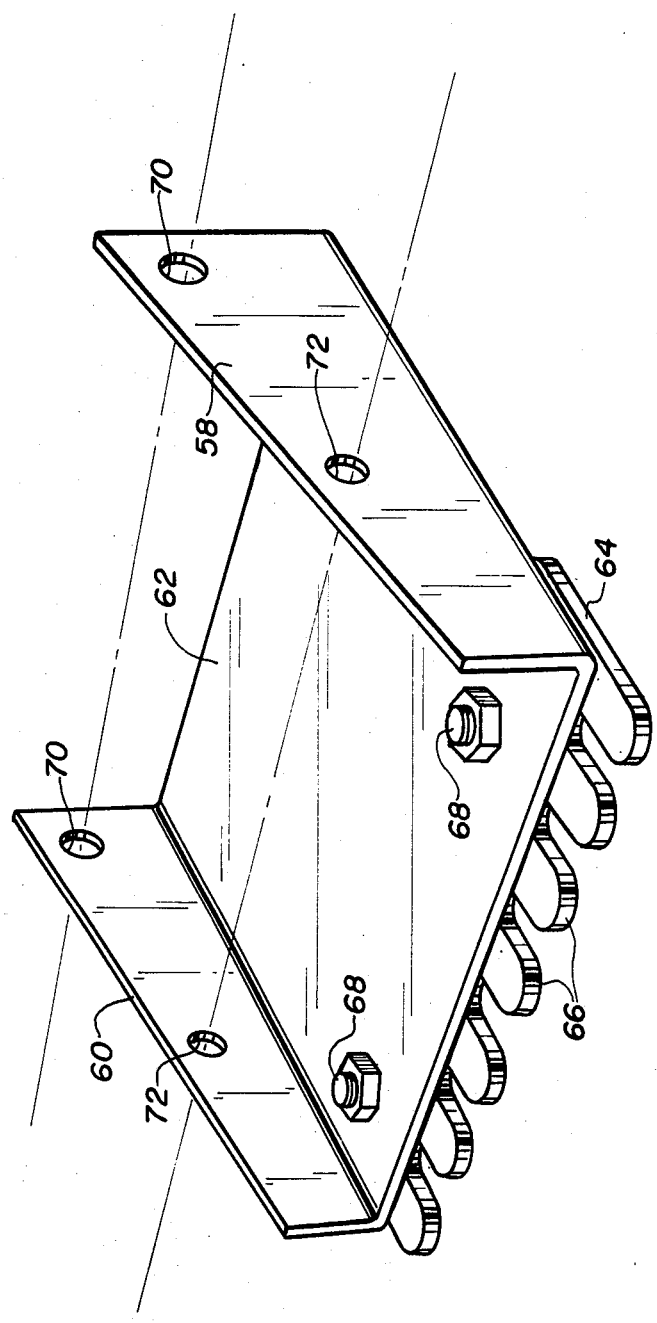
FIG. 4 is an enlarged perspective view of one of the expeller paddles.

Referring now to FIGS. 2 and 3, the expeller 24 includes support members or plates 36,38 and 40 fixed to the central shaft 26 in a spaced apart relationship and disposed parallel to each other. One set of four paddles 42,44,46,48 is mounted between the plates 36 and 38, and another set of four paddles 50,52,54,56 is mounted between the plates 38 and 40. Each of the paddles 42,44,46,48 has an inner end disposed adjacent the shaft 26 and an outer end spaced from the shaft 26. As also seen in FIG. 4, each of the paddles 42-56 is formed preferably of a piece of metal bent into a generally U-shaped configuration with side portions 58,60 and a center portion 62. An edge member 64 having a series of teeth 66 is attached by bolts 68 to the outer end of the center portion 62 of each of the paddles 42-56. Holes 70 and 72 are provided in the side portions 58,60 of the paddles 42-56 at spaced locations for receiving fasteners such as bolts 74 and 76, respectively, which fasten the paddles 42-56 in extended positions to the plates 36,38 and 40. The bolts 76 are substantially smaller in diameter than the bolts 74 and are designed to fail, i.e., break or shear off, when a predetermined load is exerted on the paddles 42-56 in a direction to rotate the paddles about the bolts 74. The predetermined load that is selected will not be enough to cause any significant deformation of the paddles 42-56, the plates 36-40, or the shaft 26 of the expeller 24. It should be noted that the smaller bolts 76 are located closer to the outer ends of the paddles 42-48 than to the inner ends thereof.

Upon viewing the paddles 44 and 52 in FIG. 2, it will be understood that the side portions 58,60 of the paddles 42-56 are not disposed perpendicular to the center portions 62 thereof. Accordingly, when the paddles 42-56 are fastened to the plates 36,38,40 by the bolts 74,76, the center portions 62 of the paddles will be skewed with respect to the longitudinal axis of the shaft 26. Such orientation of the paddles 42-56 results in a reduction of the horsepower required for rotating the expeller 24 to discharge manure from the tank 18.

During operation of the manure spreader 10, the auger 20 rotates in a clockwise direction and the expeller 24 rotates in a counterclockwise direction when viewed from in front of the manure spreader 10. This counterclockwise rotation of the expeller 24 causes the paddles 42-56 in their extended positions to engage the manure exiting through the opening in the tank sidewall 18d and thereby discharge the manure away from the tank 18 in an overshot manner. Should any one of the paddles 42-56 contact a foreign object such as a rock in the manure while the expeller 24 is rotating, the bolts 76 attaching that one paddle to the associated plates will fail, i.e., break or shear off, and the paddle will be pivoted on the bolt 74 to a retracted position if the foreign object exerts the predetermined load on the paddle. In FIG. 3, paddle 44 is shown in a retracted position in phantom after the bolts 76 attaching it to the plates 36 and 38 have broken. The paddle 44 will be held in the retracted position by a clamping action of the bolts 74 and will not be free to swing back and forth on the bolts 74. When it is desired to replace the broken bolts 76 with new ones, the paddle 44 will be moved manually back to its extended position shown in solid lines in FIG. 3 and new bolts 76 will be installed.

From the foregoing description, it is apparent that the expeller of the present invention will not suffer any significant deformation when contacting rocks in the manure while being quiet during operation and durable. This is accomplished in the expeller 24 of the preferred embodiment by using the smaller bolts 76 which are disengageable for unfastening the paddles 42-56 from the plates 36,38,40 at the location of holes 72 when the predetermined load is exerted on the paddles while the larger bolts 74 remain engaged to keep the paddles 42-48 fastened to the plates 36,38,40 at the location of the holes 70.

It will be understood that other types of fasteners may be substituted for the bolts 74 and 76. For example, the bolts 76 could be replaced by ball and detent releasable fasteners designed to be overcome by a preselected load so that the paddles 42-56 can be unfastened from the plates 36,38,40. Also, the bolts 74 could be replaced by permanent fasteners such as rivets or pins.

In another embodiment of the present invention, the bolts 74 would be replaced by leaf springs engaging the inner ends of the paddles 42-56 adjacent the shaft 26 to releasably hold the paddles in extended positions. These leaf springs would be overcome by a preselected load so that the paddles 42-56 may be pivoted on the bolts 76 to retracted positions.

It is also understood that the expeller 24 may rotate in the same direction as the auger 20 and thereby discharge manure from the tank 18 in an undershot manner.

The following claims are intended to cover all modifications and variations of the preferred embodiment of the invention without departing from the spirit and scope of the invention.

Having thus described the invention, what is claimed is:

1. In a manure spreader having a tank for containing manure, an auger conveyor rotatably mounted in said tank, and an expeller for discharging manure away from said tank, said expeller comprising:
    a shaft mounted for rotation;
    a pair of support members spaced apart and connected to rotate with said shaft;
    a plurality of paddles fastened between said pair of support members by first and second fastener means at first and second locations, respectively, said paddles each having an inner end disposed adjacent said shaft and an outer end spaced from said shaft, said first fastener means being located closer to the outer ends of said paddles than to the inner ends thereof; and
    only said first fastener means being disengageable for unfastening said paddles from said support members at said first location whenever a predetermined load is exerted on said paddles while said second fastener means remain engaged to keep the paddles fastened to said support members at said second location.

2. The expeller of claim 1, wherein said first fastener means comprises bolts which are designed to fail under said predetermined load.

3. The expeller of claim 1, wherein said paddles are movable from extended positions to retracted positions when said first fastener means are disengaged.

4. The expeller of claim 3, wherein said second fastener means holds said paddles in said retracted positions.

5. The expeller of claim 1, wherein each of said paddles is generally U-shaped with side portions and a center portion, and said first and second fastener means attach said side portions to said support members.

6. The expeller of claim 5, wherein said center portion of each of said paddles is skewed with respect to the longitudinal axis of said shaft.

7. The expeller of claim 6, wherein said support members comprise plates fixed to said shaft and disposed substantially parallel to each other.

* * * * *